(12) United States Patent
Clifton et al.

(10) Patent No.: US 8,595,711 B2
(45) Date of Patent: Nov. 26, 2013

(54) FUNCTION-LEVEL COMPILER PROCESSING OPTIMIZATION

(75) Inventors: Nicholas O. J. Clifton, Halse Taunton (GB); David M. Brolley, Toronto (CA); Eric J. Bachalo, Kelowna (CA)

(73) Assignee: Red Hat, Inc., Raleigh, NC (US)

(*) Notice: Subject to any disclaimer, the term of this patent is extended or adjusted under 35 U.S.C. 154(b) by 1392 days.

(21) Appl. No.: 11/599,729

(22) Filed: Nov. 14, 2006

(65) Prior Publication Data

US 2008/0115120 A1 May 15, 2008

(51) Int. Cl.
*G06F 9/45* (2006.01)
(52) U.S. Cl.
USPC .......................................................... 717/145
(58) Field of Classification Search
USPC .................................. 717/124–135, 140–158
See application file for complete search history.

(56) References Cited

U.S. PATENT DOCUMENTS

| | | | | |
|---|---|---|---|---|
| 5,230,050 A * | 7/1993 | Iitsuka et al. | | 717/145 |
| 6,139,199 A * | 10/2000 | Rodriguez | | 717/159 |
| 6,473,897 B1 * | 10/2002 | Ansari et al. | | 717/136 |
| 6,738,967 B1 * | 5/2004 | Radigan | | 717/146 |
| 6,922,829 B2 * | 7/2005 | Ward et al. | | 717/154 |
| 7,421,681 B2 * | 9/2008 | DeWitt et al. | | 717/128 |
| 2003/0208749 A1 * | 11/2003 | Rajagopalan | | 717/158 |
| 2005/0010912 A1 * | 1/2005 | Adolphson et al. | | 717/151 |
| 2005/0246699 A1 * | 11/2005 | Lagergren | | 717/153 |
| 2008/0092124 A1 * | 4/2008 | Archambault et al. | | 717/140 |

OTHER PUBLICATIONS

Cooper et al., "Optimizing for Reduced Code Space using Genetic Algorithms"; LCTES '99, 1999, 9pg.*
Leair, Mark, "Balancing Code Size and Performance for ST100 Processor Cores"; STMicroelectronics, Sep. 2004, p. 47-55.*
Triantafyllis et al., "Compiler Optimization-Space Exploration", IEEE, 2003, 12pg.*
Voss et al., "High-Level Adaptive Program Optimization with ADAPT", PPOPP'01, ACM, 2001, 10pg.*
SID, whitepaper. Cited at http://sourceware.org/sid/, (Jul. 10, 2002), 3 pages.
Costa, Roberto, et al., "Hardware Parameters of VLIW Cores and Code Quality Factors Affecting Alias Analysis Impact", *St. Journal of Research, STMicroelectronics*, vol. 1—No. 2, (2004), pp. 97-108.
De Ferriere, F., et al., "Optimizing Translation Out of SSA Using Renaming Constraints", *St. Journal of Research, STMicroelectronics*, vol. 1—No. 2, (2004), pp. 81-96.
De Paoli, Serge, "FlexPerf a Performance Evaluation Framework for Embedded Software and Architectures", *St. Journal of Research, STMicroelectronics*, vol. 1—No. 2, (2004), pp. 17-31.
Deveau, Jean-Marc, et al., "A Retargetable Register Allocation Framework for Embedded Processors", *St. Journal of Research, STMicroelectronics*, vol. 1—No. 2, (2004), pp. 67-80.
Faraydon, Karim, et al., "A Multi-Level Computing Architecture for Embedded Multimedia Applications", *St. Journal of Research, STMicroelectronics*, vol. 1—No. 2, (2004), pp. 4-16.

(Continued)

*Primary Examiner* — Li B Zhen
*Assistant Examiner* — Ryan Coyer
(74) *Attorney, Agent, or Firm* — Lowenstein Sandler LLP

(57) ABSTRACT

Methods and software to repeatedly translate a portion of a compilation unit into sequences of executable instructions under the control of a variety of different options; the sequences are compared to select a preferred set of options.

22 Claims, 5 Drawing Sheets

(56) References Cited

OTHER PUBLICATIONS

Garatti, Marco, "FICO: A Fast Instruction Cache Optimizer", *St. Journal of Research, STMicroelectronics*, vol. 1—No. 2, (2004), pp. 56-66.

Piccinelli, Emiliano, et al., "Code Compression for VLIW Embedded Processors", *St. Journal of Research, STMicroelectronics*, vol. 1—No. 2, (2004), pp. 32-46.

* cited by examiner

FUNCTION-LEVEL COMPILER PROCESSING OPTIMIZATION

FIELD

The invention relates to software development. More specifically, the invention relates to automatic compiler optimization refinement.

BACKGROUND

Software application development is a challenging undertaking. Programmers use a number of complex tools to build and test programs. FIG. 2 shows an overview of a typical software development process. A programmer creates a source code file 200, which is usually in a human-readable, text form. Source code file 200 passes through a translation process known as compilation 205 and an object code file 210 is produced. Object code files are usually not human-readable, and usually contain instructions and data to cause a programmable processor to perform desired actions, along with information to permit further processing by other software development tools. A large software application may have several separate source files 215, 230, each of which may pass through a compilation process 220, 235 to produce corresponding object files 225 and 240. Subsequently, object files 210, 225 and 240 pass through a linking process 250 to produce an executable file 255. In addition to object files 210, 225 and 240, instructions from a library 245 may also be used by the linking process to prepare executable file 255. Executable file 255 contains data and instructions to cause a programmable processor to perform the actions of the software application that the programmer has described in source code files 200, 215 and 230.

Source code can be written in a wide variety of computer programming languages. Some popular programming languages are C, C++, Java and Perl. C and C++ are compiled languages: they are usually translated through the compiling and linking process into sequences of machine instructions that are directly executed by a microprocessor or similar programmable processing device. Java is a bytecode language: programs written in Java are usually translated into codes that control the operation of a "virtual machine" ("VM"), which is itself a software application implemented as a sequence of machine instructions that are directly executed by a microprocessor. Perl is an interpreted language: a program known as an interpreter processes the source code file directly, converts it to an internal form, and executes it. However, hybrid sets of software development tools can be used, for example, to interpret C programs or compile Java and Perl programs into machine instruction sequences.

Compilation, the process of turning a program in a first or "source" language, into a sequence of executable instructions, is itself a complicated process. Programming languages are often designed to make it easier for programmers to express intricate logical operations, while programmable processors and VMs operate on sequences of relatively simple executable instructions or codes that are chosen for their ease of implementation in hardware circuitry. A simple compiler can translate source code into a basic sequence of executable instructions, but the sequence may be inefficient in terms of memory utilization and/or execution speed. Optimizing compilers use a wide range of techniques to generate improved sequences of executable instructions that retain the logical functionality expressed by the source program. Optimizing techniques are an active area of research in computer science.

Optimizing compilers frequently offer programmers the opportunity to suggest useful sorts of optimizations to apply. For example, a programmer writing an application for an embedded system with a small memory might direct the compiler to produce a short program, even at the expense of some execution inefficiency. On the other hand, an application intended to run on a system with a large amount of memory might be compiled to use fast-executing instruction sequences, even when such sequences consume extra memory. Some optimization techniques may not consistently produce faster, smaller, or otherwise better code in all circumstances, so a programmer may have to spend time tweaking compiler operational controls (e.g. command line parameters, control files, etc.) to achieve acceptable results for an individual application, or for individual source code modules within an application. Methods to refine and automate the search for compiler control parameters that achieve better results for a software application may be of value in this field.

BRIEF DESCRIPTION OF DRAWINGS

Embodiments of the invention are illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

DETAILED DESCRIPTION

Embodiments of the invention isolate a portion of a software application and automatically search for a set of compilation options that cause the compiler to translate the portion into a favorable sequence of executable instructions. Favorable sequences may be shorter (thus consuming less memory), may execute faster, or may have some other desirable characteristic.

Figure 1:
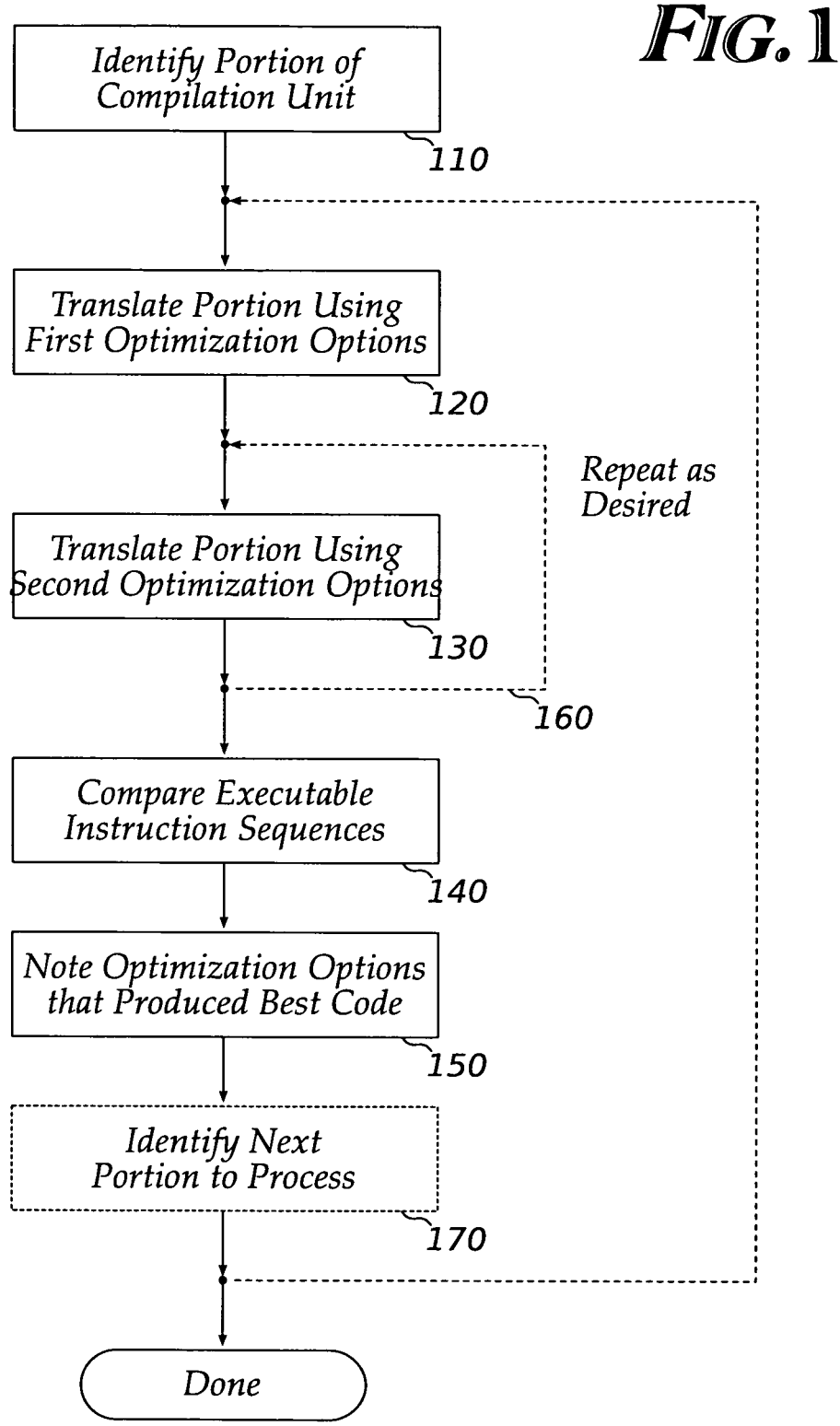
FIG. 1 is a flow chart outlining compilation operations according to an embodiment of the invention.
Figure 2:
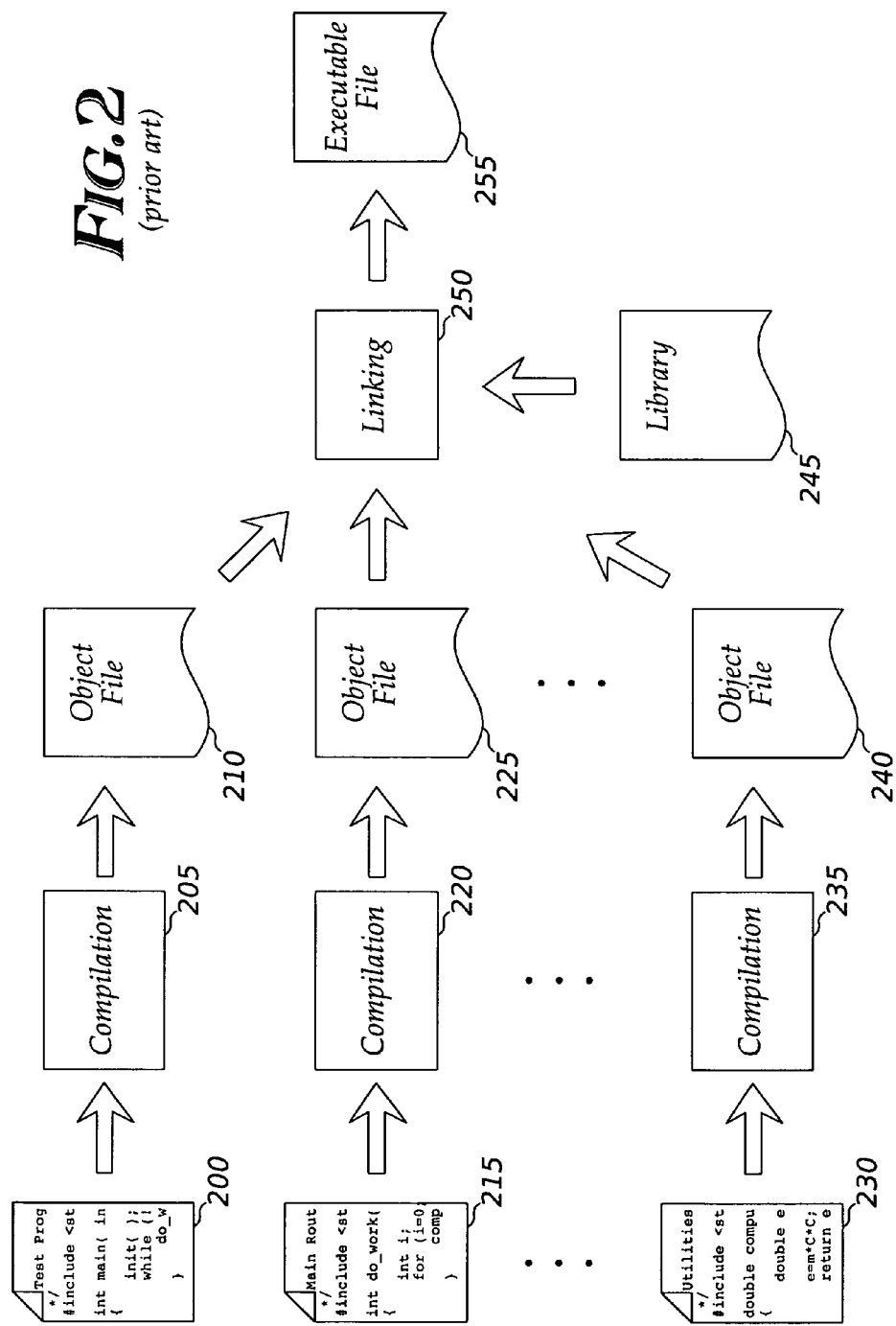
FIG. 2 shows an overview of a typical software application development process.

FIG. 1 outlines a method according to an embodiment of the invention. This method can be used with a complete software application, or with a single compilation unit (e.g. a source code file) that will eventually be linked into an application. First, a portion of the compilation unit is identified (110). The portion may be a complete function or subroutine, or a fragment of a function (for example, the consequent or alternative block of an "if" statement, the body of a loop, or another sequence of statements). The portion may be identified by visual inspection or through testing and profiling as a significant consumer of processing resources, and consequently deserving of special attention to compilation optimization.

The identified portion is translated to a first sequence of executable instructions under the control of a first set of compiler optimization options (120), and then to a second sequence of executable instructions under the control of a second set of compiler optimization options (130). The first set of compiler optimization options may include, for example, an option to select a "default" set of optimizations for the target processor. The second set of compiler optimization options may include, for example, options to enable only one optimization method (e.g. loop unrolling, dead code removal, or function inlining). The two sequences of executable instructions are compared (140), and the compiler options that produced the better sequence of executable instructions are noted (150) for use in future compilations of the identified portion.

More generally, operations 120 and 130 can be performed an arbitrary number of times, as indicated by dashed line 160, to find a set of compiler optimization options that produce a better translation of the portion of the compilation unit to executable instruction sequence. Once a set of compiler options for a first portion of the compilation unit is found, an embodiment may proceed automatically to search for optimal options for a next portion of the compilation unit (170). For example, an embodiment can iterate over the functions in the compilation unit, searching for optimal options for each individual function. An embodiment can also search for good optimization settings for portions of the compilation unit in parallel, by arranging for different options to be applied to different portions during a single compilation cycle. The application can be tested at the end of the compilation cycle and information about the performance, fitness and/or size of each portion (as compiled with the selected options) collected and used to direct further searching for better optimization options.

Comparing sequences of executable instructions, as shown at 140, may entail comparing the lengths of the sequences (either the number of executable instructions or the number of bytes making up the sequences) to find the shortest sequence or the sequence that best fits into an instruction cache of a programmable processor. The sequences can also be compared by simulating their execution (or by actually executing them) and selecting the faster sequence. Other metrics for comparing executable instruction sequences may be useful in some situations. For example, a computer system may have an area of memory with faster (or slower) access speed, so instruction sequences that make increased (reduced) use of that area of memory are favored.

The portion of a compilation unit that is to be repeatedly translated to produce executable instruction sequences for comparison may be designated in a number of different ways. Some ways that could be used for a program written in the C programming language will be discussed here. Those of skill in the art are capable of devising similar techniques for use with other programming languages.

In C, a program is composed of one or more functions or subroutines (the difference is immaterial in C, although other programming languages distinguish between functions and subroutines). Each subroutine has a name, so one way of designating a portion of a compilation unit may be to specify the name of a function. A compiler could be modified to accept per-function compilation optimization options, and produce a sequence of executable instructions for a named function based on the particular optimization options provided.

Another way to isolate a portion of a C compilation unit is to implement a pre-compilation processing stage where portions of the compilation unit outside of the portion of interest are replaced by null operations. For example, Listing 1 shows a simple C program to calculate the surface area and volume of a sphere.

| Listing 1 |
|---|
| 10  /* Sphere parameter calculator */ |
| 20  #include <math.h> |
| 30  double |
| 40  surface_area( double radius ) |
| 50  { |
| 60      return 4.0 * PI * radius * radius; |
| 70  } |
| 80  double |
| 90  volume( double radius ) |
| 100 { |
| 110     return 4.0 / 3.0 * PI * pow( radius, 3.0 ); |
| 120 } |
| 130 int |
| 140 main( int argc, const char **argv, const char *envp ) |
| 150 { |
| 160     printf( "%g\n", surface( 10.0 ) ); |
| 170     return 0; |
| 180 } |

Note that Listing 1 (and other listings presented in this Application) contains line numbers. Many programming languages, and the C programming language in particular, do not require or even permit line numbers. The line numbers in this Application are for the reader's convenience only. They must be removed to form a syntactically-valid, compilable program.

If it was desired to optimize the surface area function independently of the rest of the program, the compilation preprocessor could automatically change the program of Listing 1 into the program shown in Listing 2:

| Listing 2 |
|---|
| 10  /* Sphere parameter calculator */ |
| 20  #include <math.h> |
| 30  double surface_area( double radius ) |
| 40  { |
| 50      return 4.0 * PI * radius * radius; |
| 60  } |
| 70  extern double |
| 80  volume ( double radius ); |
| 90  extern int |
| 100 main( int argc, const char **argv, const char *envp ); |

Note that in Listing 2, all functions except the function of interest have been replaced by "extern" declarations (lines 70-100), which assert to the compiler that the named function will be defined by some other compilation unit. Compiling the program of Listing 2 will produce an executable instruction sequence for the surface area computing function. Compiling Listing 2 with different compiler optimization controls will produce different executable instruction sequences that can be compared to determine which optimization controls produce a better sequence for the surface area computing function. A similar technique can be used to isolate subportions of a single function for treatment according to an embodiment.

The C programming language also defines a standard mechanism called a "pragma" for communicating arbitrary information to the compiler. The mechanism is quite powerful, but is also closely tied to the specific compiler in use, so it may not be appropriate for development environments where several different compilers are in use. Listing 3 shows the same simple program, augmented with a pragma (line 50) that will cause a compiler that can process the pragma to perform a specified optimization on the function of interest.

Listing 3

```
10  /* Sphere parameter calculator */
20  #include <math.h>
30  double surface_area( double radius )
40  {
50  # pragma optimize (floating_point_unit)
60      return 4.0 * PI * radius * radius;
70  }
80  double volume( double radius )
90  {
100     return 4.0 / 3.0 * PI * pow( radius, 3.0 );
110 }
120 int
130 main( int argc, const char **argv, const char *envp )
140 {
150     printf( "%g\n", surface( 10.0 ) );
160     return 0;
170 }
```

Once a portion of a compilation unit is designated, the compilation unit can be repeatedly translated into sequences of executable instructions under the influence of different optimization control options. However, a compiler may have dozens or hundreds of possible optimization techniques available, that can be individually enabled or disabled with an appropriate setting. Testing the effect of every combination of options may be prohibitively time-consuming. Therefore, in some embodiments, a genetic algorithm is used to search for favorable option combinations.

A genetic algorithm simulates the evolution of a system under pressure from a fitness function. In embodiments of the present invention, a first "population" of different compiler optimization option settings is created (e.g. by random selection), and the executable sequences produced by translating the portion of the compilation unit under the control of each setting are compared. The fitness function assigns a fitness to each group of settings based on the desired criteria (e.g. small code size, fast execution, etc.) The best groups of settings are combined in various ways to create a second generation population, and the executable sequences produced by translating the portion of the compilation unit under the control of the second generation settings are also compared. This process may be repeated for several generations. Eventually, the settings that produce the best results of any setting tested can be used to compile the portion of the compilation unit.

Figure 3:
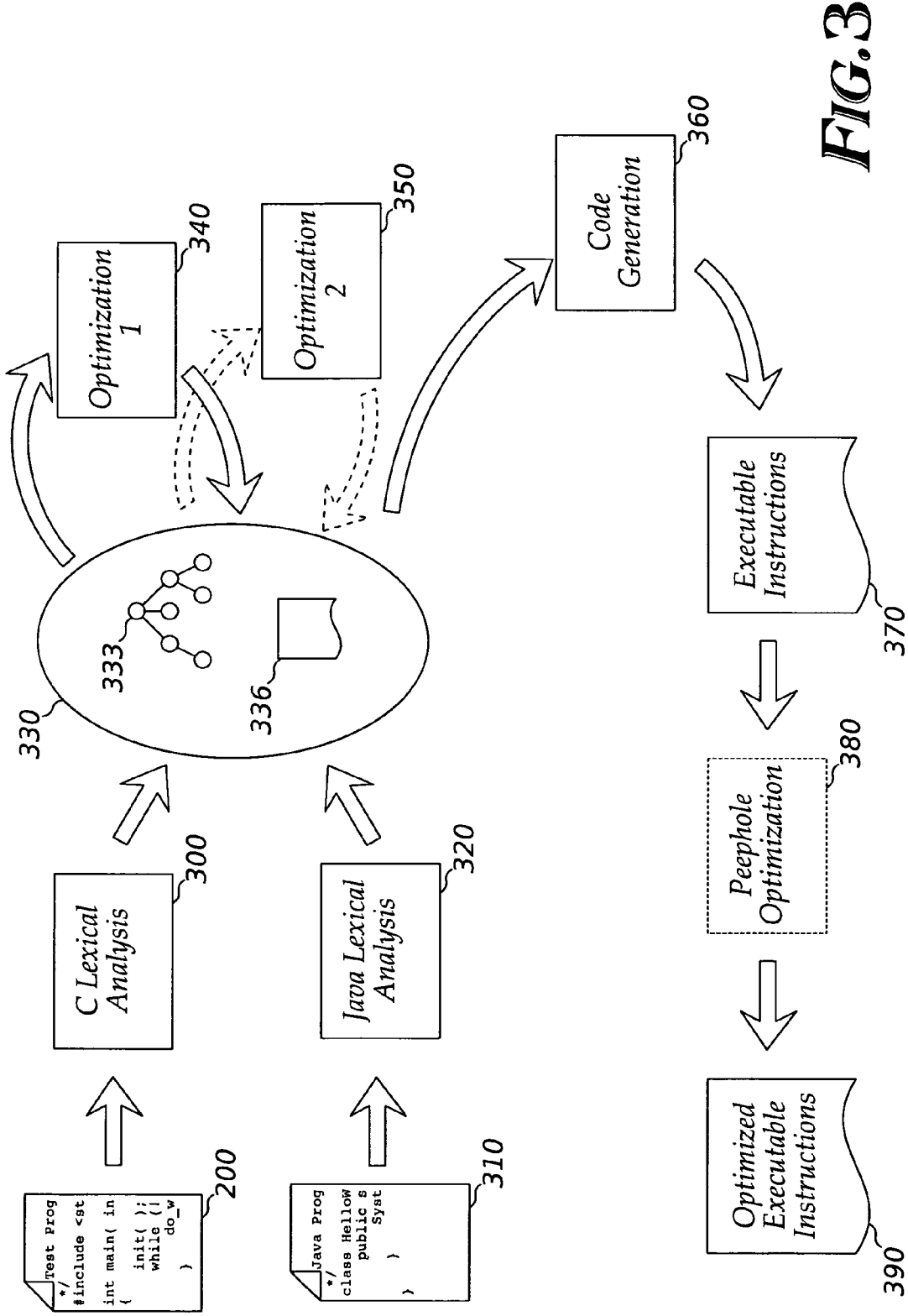
FIG. 3 depicts compilation operations in greater detail.

Since compilation is often a time-consuming process, and embodiments of the invention perform repeated compilations, techniques to improve the efficiency of the search for favorable compilation optimization options may be of value. FIG. 3 shows an expanded view of the process of translating a portion of a source code file into a sequence of executable instructions to illustrate opportunities for reducing the time required to search for good optimization options.

The compiling process starts with a source compilation unit 200, such as a file written in the C programming language. The source compilation unit may have been automatically generated by an earlier development tool (not shown). A compiler typically performs a lexical analysis process 300 to convert source compilation unit 200 into an intermediate form 330, such as a parse tree 333 or a register transfer language ("RTL") pseudo-instruction sequence 336. Note that source compilation units in other languages (such as Java program 310) can be converted into a similar or compatible intermediate form by a lexical analyzer that can process the other language (shown here as element 320). Embodiments of the invention can be used with programs in different languages.

Next, the compiler performs various optimizations 340, 350 on the intermediate form 330 of the compilation unit. The choice and order of optimization operations may be controlled by the optimization option settings specified by an embodiment of the invention. After all intermediate-form optimizations are completed, a code-generation process 360 converts the optimized intermediate form of the compilation unit into a sequence of executable instructions 370. One or more "peephole" optimizations 380 may be performed on the sequence of executable instructions 370 to produce an optimized sequence of executable instructions 390. This sequence of executable instructions is compared with other sequences generated by compiling the compilation unit under the control of different optimizing options to select a better set of options.

In some embodiments, the lexical analysis phase (e.g. 300, 320) may produce identical results from run to run, so the repeated optimizations (see FIG. 1, elements 120, 130 and 160) may be performed on the intermediate form of the compilation unit, thus saving the cost of repeated lexical analyses. Compilers for some computer languages perform several processes to produce the intermediate form from the compilation unit, and it may be possible to factor some of these processes out of the iterative processing according to an embodiment of the invention. For example, C compilers perform a (mostly) textual preprocessing operation to prepare an ephemeral C program from an input compilation unit. This processing need only be performed once.

One compiler that is suitable for use with an embodiment of this invention is the GNU C compiler. GNU C uses an intermediate-form process similar to that shown in FIG. 3, so the improvements discussed above are applicable. Also, various "front ends" are available to process different languages into the intermediate form so that the GNU C "back end" can perform the specified optimizations. For example, "gcj" is the GNU Java compiler, and "gobjc" is the GNU Objective-C compiler. Front ends for the Pascal and Fortran programming languages are also available. Other compilers that offer a variety of optimization control options, such as the Microsoft Visual C compiler, can also be used with an embodiment of the invention.

Figure 4:
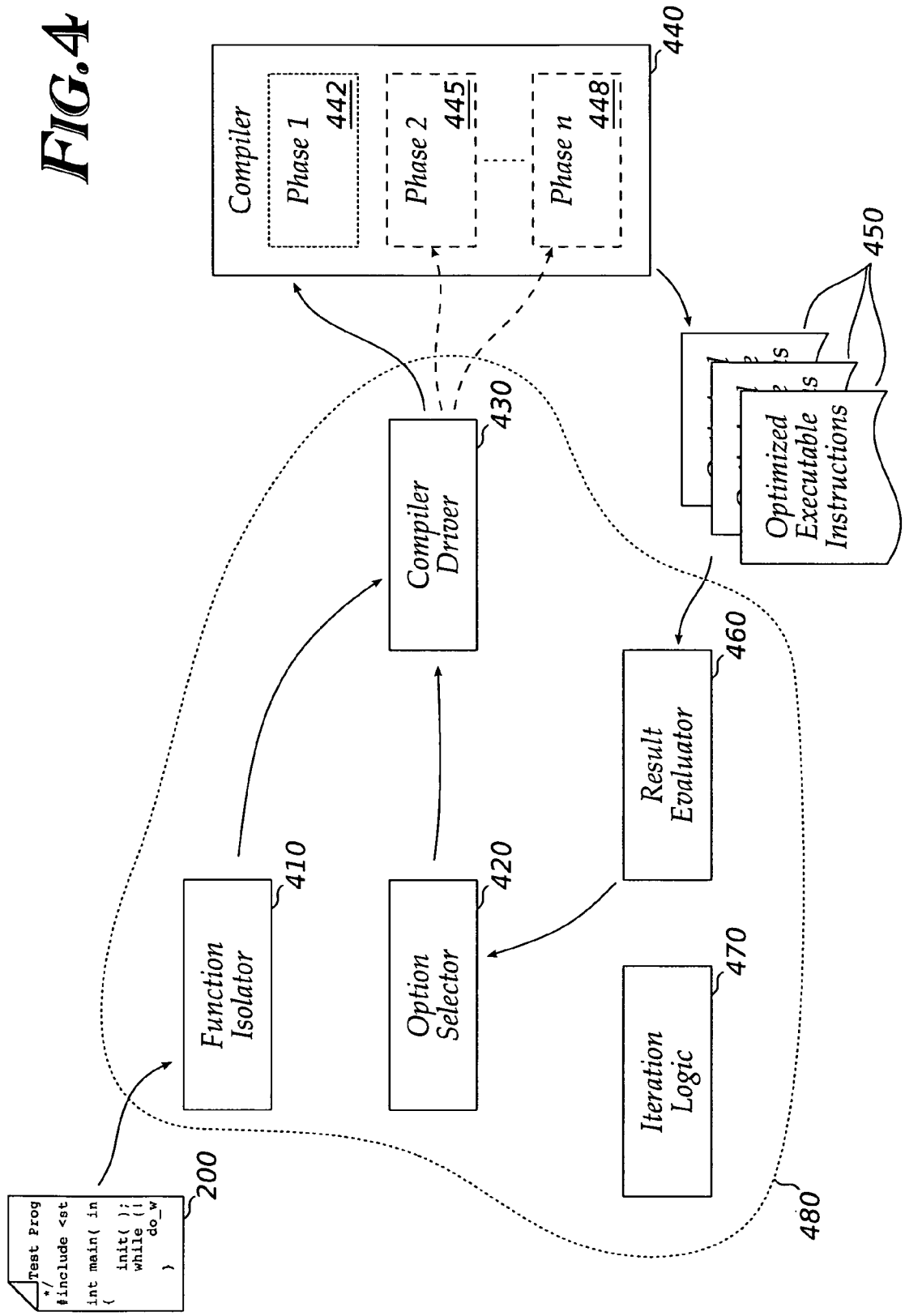
FIG. 4 is a block diagram of one way of dividing the logical functions of an embodiment of the invention.

FIG. 4 is a logical block diagram that shows one way the functions of an embodiment can be divided. A function isolator 410 accepts a compilation unit such as source code file 200 as input and isolates a portion of the compilation unit. (Although block 410 is labeled "Function Isolator," it is understood that other portions of a compilation unit may be isolated. For example, an embodiment could operate to find preferred compilation parameters for the body of a loop, a branch of a conditional statement, or another portion of the compilation unit that is either larger or smaller than a function.) The function- (or portion-) isolated compilation unit is provided to compiler driver 430, which also receives compiler options from option selector 420 and interacts with compiler 440 (or with sub-portions of compiler 440, identified here as phase 1 442, phase 2 445, or phase n 448) to cause the compiler to translate the compilation unit into optimized sequences of executable instructions 450. Result evaluator 460 compares the optimized sequences of executable instructions 450 to evaluate the effects of different compiler option combinations from option selector 420. This information may be fed back to the option selector 420 to improve its option selection performance, and the best options found during this process may be reported to the user. Iteration logic 470 can control the various logical blocks identified within dashed line 480 so that successive portions of the compilation unit are isolated and favorable compilation options for each portion are selected.

Figure 5:
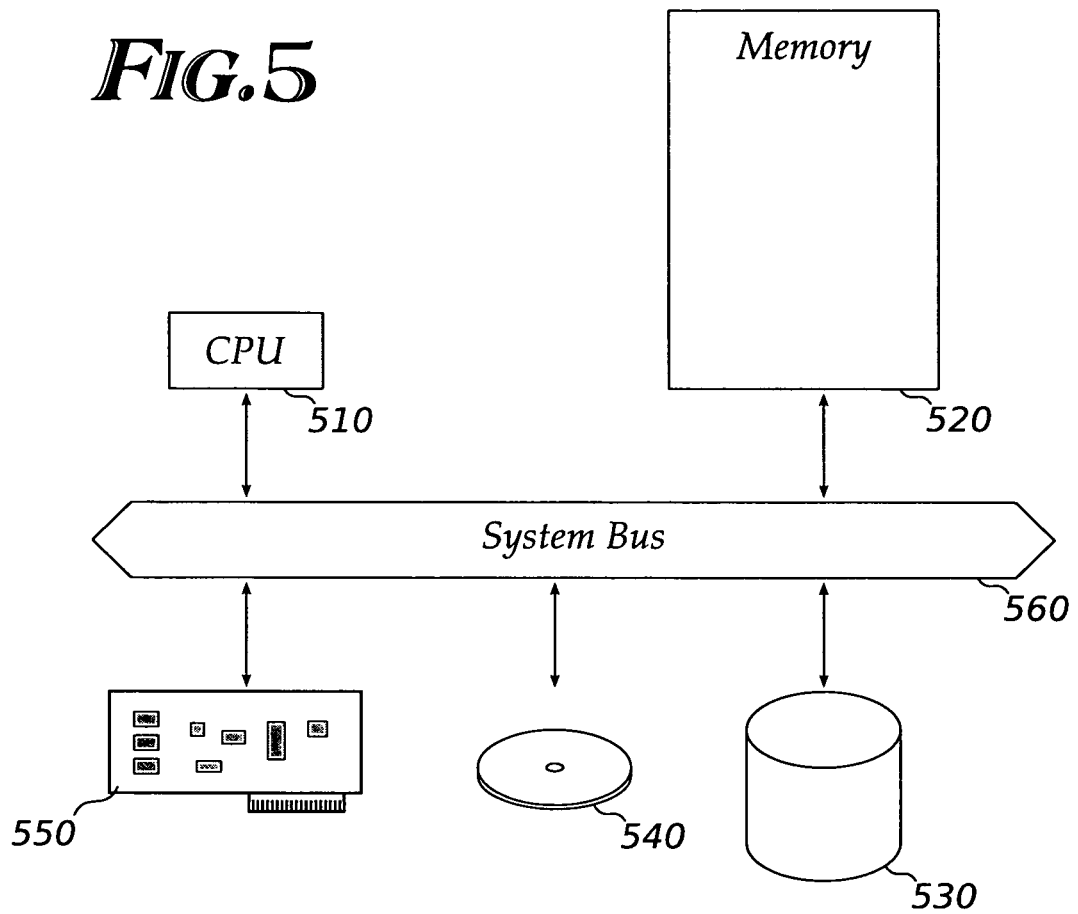
FIG. 5 illustrates a block diagram of an exemplary computer system that implements an embodiment of the invention.

FIG. 5 shows some subsystems of a typical computer system that can implement an embodiment of the invention. CPU 510 is a programmable processor that executes instructions in memory 520. These instructions cause the system to perform methods according to an embodiment of the invention. The instructions and the data on which they operate may be stored on a mass storage device such as hard disk 530 and/or Compact Disc Read-Only Memory ("CD-ROM") 540. This system also includes a network interface 550 to exchange data with other systems over a distributed data network such as the Internet. Computer system components are interconnected via a system bus 560.

An embodiment of the invention may be a machine-readable medium having stored thereon instructions to cause a programmable processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g. a computer), including but not limited to Compact Disc Read-Only Memory ("CD-ROM"), Read-Only Memory ("ROM"), Random Access Memory ("RAM"), and Erasable Programmable Read-Only Memory ("EPROM").

The applications of the present invention have been described largely by reference to specific examples and in terms of particular allocations of functionality to certain hardware and/or software components. However, those of skill in the art will recognize that selection of favorable compilation optimization options can also be achieved by software and hardware that distribute the functions of embodiments of this invention differently than herein described. Such variations and implementations are understood to be captured according to the following claims.

An embodiment of the invention may be a machine-readable medium having stored thereon instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories (ROMs), random access memories (RAMs), eraseable, programmable read-only memories ("EPROMs"), electrically-eraseable read-only memories ("EEPROMs"), magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

The applications of the present invention have been described largely by reference to specific examples and in terms of particular allocations of functionality to certain hardware and/or software components. However, those of skill in the art will recognize that loadable module verification can also be achieved by software and hardware that distribute the functions of embodiments of this invention differently than herein described. Such variations and implementations are understood to be captured according to the following claims.

We claim:

1. A method comprising:
identifying, prior to producing sequences of optimized executable instructions associated with a source code file, a portion of a compilation unit that consumes a larger amount of a processing resource than other portions of the compilation unit, wherein the compilation unit is at least one of the source code file or an intermediate form of the source code file;
isolating, prior to producing the sequences of the optimized executable instructions, the identified portion of the compilation unit from other portions of the compilation unit;
repeatedly translating, by a processing device, the isolated portion of the compilation unit to produce the sequences of optimized executable instructions, wherein each iteration of the translating applies different compiler optimization options to different subportions of the isolated portion in parallel;
selecting a compiler optimization option of the different compiler optimization options that is associated with a subportion of the different subportions that meets a performance criteria; and
compiling the portion of the compilation unit using the selected compiler optimization option associated with the subportion meeting the performance criteria.

2. The method of claim 1 wherein the comparing comprises simulating an execution of the sequences of optimized executable instructions on a target processor to select a faster-executing sequence of the sequences of optimized executable instructions based on a first predetermined metric, the first predetermined metric comprising execution speed of the faster-executing sequence, and wherein the selected compiler optimization option produces the faster-executing sequence.

3. The method of claim 1 wherein the comparing comprises comparing a number of bytes of the sequences of optimized executable instructions to select a shorter sequence of the sequences of optimized executable instructions based on a second predetermined metric, the second predetermined metric comprising code size of the shorter sequence, and wherein the selected compiler optimization option produces the shorter sequence.

4. The method of claim 1 wherein the repeatedly translating is performed by a GNU C compiler or a Java compiler.

5. A non-transitory computer-readable medium containing instructions to cause a processing device to perform operations comprising:
identifying, prior to producing sequences of optimized executable instructions associated with a source code file, a portion of a compilation unit that consumes a larger amount of a processing resource than other portions of the compilation unit, wherein the compilation unit is at least one of the source code file or an intermediate form of the source code file;
isolating, prior to producing the sequences of the optimized executable instructions, the identified portion of the compilation unit from other portions of the compilation unit;
repeatedly translating, by the processing device, the isolated portion of the compilation unit to produce the sequences of optimized executable instructions, wherein each iteration of the translating applies different compiler optimization options to different subportions of the isolated portion in parallel;
selecting a compiler optimization option of the different compiler optimization options that is associated with a subportion of the different subportions that meets a performance criteria; and
compiling the portion of the compilation unit using the selected compiler optimization option associated with the subportion meeting the performance criteria.

6. The non-transitory computer-readable medium of claim 5 wherein the comparing comprises simulating an execution of the sequences of optimized executable instructions on a target processor to select a faster-executing sequence of the sequences of optimized executable instructions based on a first predetermined metric, the first predetermined metric comprising execution speed of the faster-executing sequence, and wherein the selected compiler optimization option produces the faster-executing sequence.

7. The non-transitory computer-readable medium of claim 5 the comparing comprises comparing a number of bytes of the sequences of optimized executable instructions to select a shorter sequence of the sequences of optimized executable instructions based on a second predetermined metric, the second predetermined metric comprising code size of the shorter sequence, and wherein the selected compiler optimization option produces the shorter sequence.

8. The non-transitory computer-readable medium of claim 5 wherein the repeatedly translating is performed by a GNU C compiler or a Java compiler.

9. A system comprising:
a memory;
a processing device communicably coupled to the memory;
a function isolator executable from the memory by the processing device, the function isolator to:
identify, prior to producing sequences of optimized executable instructions associated with a source code file, a portion of a compilation unit that consumes a larger amount of a processing resource than other portions of the compilation unit, wherein the compilation unit is at least one of the source code file or an intermediate form of the source code file; and
isolate, prior to producing the sequences of the optimized executable instructions, the identified portion of the compilation unit from other portions of the compilation unit;
an iteration logic executable from the memory by the processing device, the function isolator to repeatedly translate the isolated portion of the compilation unit to produce the sequences of optimized executable instructions, wherein each iteration of the translating applies different compiler optimization options to different subportions of the isolated portion in parallel;
a result evaluator executable from the memory by the processing device, the result evaluator to select a compiler optimization option of the different compiler optimization options that is associated with a subportion of the different subportions that meets a performance criteria; and
a compiler executable from the memory by the processing device, the compiler to compile the portion of the compilation unit using the selected compiler optimization option associated with the subportion meeting the performance criteria.

10. The system of claim 9 wherein the result evaluator is further to simulate an execution of the sequences of optimized executable instructions on a target processor to select a faster-executing sequence of the sequences of optimized executable instructions based on a first predetermined metric, the first predetermined metric comprising execution speed of the faster-executing sequence, wherein the selected compiler optimization option produces the faster-executing sequence.

11. The system of claim 9 wherein the result evaluator is further to compare a number of bytes of the sequences of optimized executable instructions to select a shorter sequence of the sequences of optimized executable instructions based on a second predetermined metric, the second predetermined metric comprising code size of the shorter sequence, wherein the selected compiler optimization option produces the shorter sequence.

12. The method of claim 1, wherein the compilation unit comprises a complete subroutine, and wherein the portion of the compilation unit comprises at least one of a branch of a conditional statement, a body of a loop, or a sequence of statements that is smaller or larger than the compilation unit.

13. The method of claim 1, wherein the repeatedly translating is performed using translating options, and wherein at least two of the translating operations are controlled by the different compiler optimization options.

14. The method of claim 1, wherein the different compiler optimization options comprise at least one of loop unrolling, dead code removal, or function inlining.

15. The non-transitory computer-readable medium of claim 5, wherein the compilation unit comprises a complete subroutine, and wherein the function portion of the compilation unit comprises at least one of a branch of a conditional statement, a body of a loop, or a sequence of statements that is smaller or larger than the compilation unit.

16. The non-transitory computer-readable medium of claim 5, wherein the repeatedly translating is performed using translating options, and wherein at least two of the translating operations are controlled by the different compiler optimization options.

17. The non-transitory computer-readable medium of claim 5, wherein the different compiler optimization options comprise at least one of loop unrolling, dead code removal, or function inlining.

18. The system of claim 9, wherein the compilation unit comprises a complete subroutine, and wherein the function portion of the compilation unit comprises at least one of a branch of a conditional statement, a body of a loop, or a sequence of statements that is smaller or larger than the compilation unit.

19. The system of claim 9, wherein the iteration log to repeatedly translate further comprises the iteration logic to utilize translating options, and wherein at least two of the translating operations to be controlled by the different compiler optimization options.

20. The system of claim 9, wherein the different compiler optimization options comprise at least one of loop unrolling, dead code removal, or function inlining.

21. The method of claim 1 wherein the repeatedly translating is performed by a Visual C Compiler.

22. The non-transitory computer-readable medium of claim 5 wherein the repeatedly translating is performed by a Visual C Compiler.

* * * * *